(12) United States Patent
McKinney et al.

(10) Patent No.: US 9,654,217 B2
(45) Date of Patent: May 16, 2017

(54) INTERFERENCE SUPPRESSION BASED ON POWER-DEPENDENT TRANSFER FUNCTION OF ANGLE-MODULATED OPTICAL LINKS

(71) Applicant: The United States of America, as represented by the Secretary of the Navy, Washington, DC (US)

(72) Inventors: Jason D. McKinney, Bowie, MD (US); Vincent J. Urick, Alexandria, VA (US); John F. Diehl, Bowie, MD (US); Keith J. Williams, Dunkirk, MD (US)

(*) Notice: Subject to any disclaimer, the term of this patent is extended or adjusted under 35 U.S.C. 154(b) by 0 days.

(21) Appl. No.: 15/046,537

(22) Filed: Feb. 18, 2016

(65) Prior Publication Data
US 2016/0248503 A1   Aug. 25, 2016

Related U.S. Application Data

(60) Provisional application No. 62/120,423, filed on Feb. 25, 2015.

(51) Int. Cl.
*H04B 10/06* (2006.01)
*H04B 10/2575* (2013.01)
*H04B 10/69* (2013.01)

(52) U.S. Cl.
CPC ....... *H04B 10/2575* (2013.01); *H04B 10/697* (2013.01); *H04B 2210/006* (2013.01)

(58) Field of Classification Search
CPC .......... H04B 10/2575; H04B 2210/006; H04B 10/1143; H04B 10/25758; H04B 10/25752; H04B 10/25753; H04B 10/1125; H04B 10/00; H04B 10/25137; H04B 10/2507; H04B 10/25133; H04B 10/66; H04B 10/695; H04B 10/61; H04B 10/697; H04B 10/6971; H04B 10/6972; H04B 10/6973; H04W 88/085; H04J 14/02; G02B 6/29394
USPC .......... 398/115, 116, 158, 159, 208
See application file for complete search history.

(56) References Cited

U.S. PATENT DOCUMENTS

| 7,856,184 | B2 * | 12/2010 | Li ............ H04B 10/25758 398/115 |
| 8,768,173 | B2 * | 7/2014 | Tanimura ............ H04B 10/61 370/276 |
| 8,934,777 | B2 * | 1/2015 | Chang ............ H04B 10/25753 375/222 |
| 9,425,897 | B2 * | 8/2016 | Nishihara .......... H04B 10/2575 |
| 9,444,502 | B2 * | 9/2016 | Kpodzo ............ H04B 1/1027 |

* cited by examiner

*Primary Examiner* — M. R. Sedighian
(74) *Attorney, Agent, or Firm* — U.S. Naval Research Laboratory; William Ladd

(57) ABSTRACT

Systems and method are provided to for suppressing interference signals in optical systems, without prior knowledge of the type of location of the interferers, while maintaining a linear response to small signals of interest (SOI). By exploiting the unique power (or voltage) dependent transmission function of an externally angle-modulated photonic link, embodiments of the present disclosure are configured to provide strong, wideband interference suppression without requiring detailed knowledge of the interfering signal.

20 Claims, 12 Drawing Sheets

US 9,654,217 B2

INTERFERENCE SUPPRESSION BASED ON POWER-DEPENDENT TRANSFER FUNCTION OF ANGLE-MODULATED OPTICAL LINKS

CROSS REFERENCE TO RELATED APPLICATIONS

This application claims the benefit of U.S. Provisional Patent Application No. 62/120,423, filed on Feb. 25, 2015, which is incorporated by reference herein in its entirety.

FIELD OF THE DISCLOSURE

This disclosure relates to optical systems, including interference suppression for optical systems.

BACKGROUND

As radio frequency (RF) receivers become capable of increasing amounts of sensitivity, they become correspondingly increasingly susceptible to high-power interference, which can prevent reception and/or detection of a desired signal. A variety of situations exist where the sensitivity of the RF receiver can be compromised by undesired strong signals. For example, communications infrastructure can render co-located electronic counter-measure (ECM) systems blind during transmission, and spurious radio transmissions can corrupt signals intelligence (SIGINT) collections. With increasing spectral occupancy concerns, the importance of interference mitigation continues to escalate.

Conventional techniques for mitigating interference suffer several drawbacks. These drawbacks include requirements to know the type or location of interferers before taking action to suppress the interference. For example, many conventional techniques for mitigating interference require intimate knowledge of the frequency and/or time-delay (absolute phase) of the interfering signal(s).

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
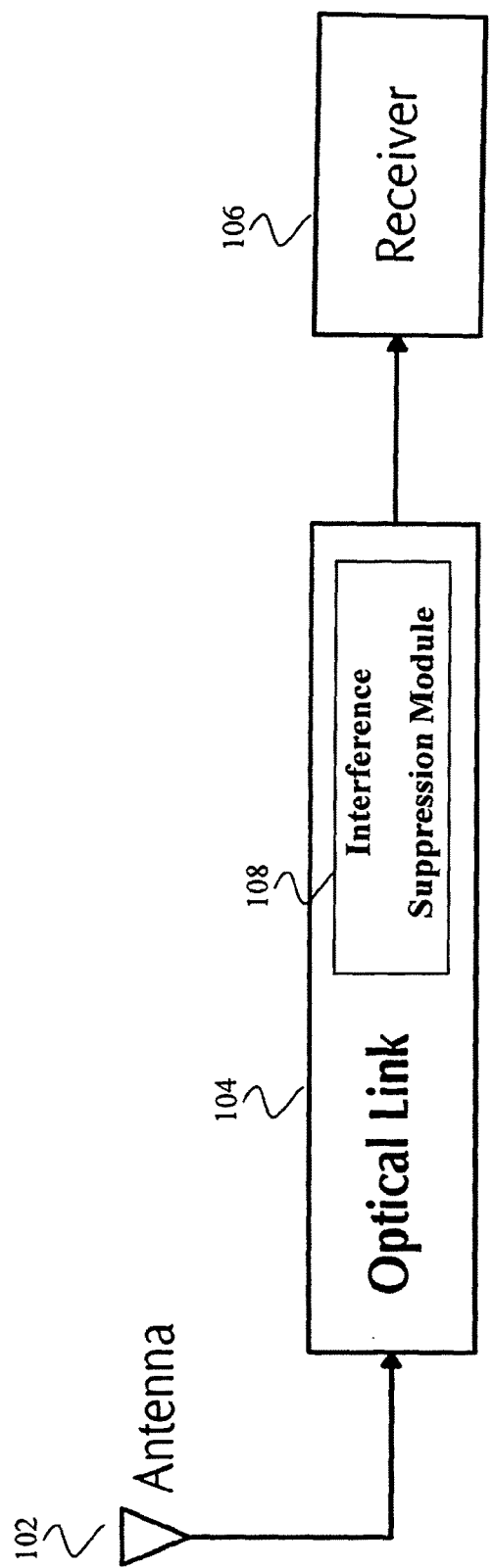
FIG. 1 is a schematic of an application of an embodiment of the present disclosure of a radio frequency (RF) system with an optical link.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. OVERVIEW

Embodiments of the present disclosure provide systems and methods for suppressing high-power interference signals in optical systems, without prior knowledge of the type of location of the interferers, in these applications while maintaining a linear response to small signals of interest (SOI). For example, embodiments of the present disclosure provide systems and methods for suppressing interference based on the power of the interfering signal. By exploiting the unique power (or voltage) dependent transmission function of an externally angle-modulated photonic link, embodiments of the present disclosure are configured to provide strong, wideband interference suppression without requiring detailed knowledge of the interfering signal. The ability to effectively remove such strong interference can significantly enhance radar operation, signal collection, and detection in environments where large undesired signals currently prohibit these operations.

2. INTERFERENCE SUPPRESSION

A variety of electronic techniques may be employed to minimize interference. As examples, (frequency) notch filtering to remove strong known narrowband interferers can be used in radar applications. While applicable to fixed-frequency interference (for example, a radio station), this technique is not readily applicable to frequency-hopped or wideband signals, as significant tunability—beyond the state of the art—is required. In other applications, such as co-located communication and electronic support measures (ESM) or ECM systems, only one operation occurs at any given time—that is, when the communications system is active ESM or ECM systems (electronic warfare) are not and vice versa. While effective in ensuring against fratricide, the utility of the electronic warfare systems is reduced due to forced periods of blindness.

The ability to precisely control the amplitude and phase of wideband RF signals using photonic techniques could prove quite powerful in interference mitigation. A variety of techniques can be used to address the interference problem, but many of these techniques have corresponding drawbacks. For example, these techniques include straight-forward cancellation, where a cancellation signal is matched in amplitude and phase to the interference such that, when combined in the optical or electronic domain, the interference is effectively suppressed by the tailored cancellation signal. While effective, these techniques require that the absolute phase of the interferer be known and reproducible with a 180° phase shift in order to achieve broad bandwidth applicability. In practice, this knowledge may only be acquired in very specific circumstances where the location of the interferer is known.

Similar in concept are techniques which exploit the fact that common-mode signals do not contribute to measurable intensity fluctuations in interferometric modulators. These techniques suffer a similar requirement—the time-delay (absolute phase) of the interference signal must be known. Another possible technique uses notch filtering achieved through microwave photonic filters. Here, the filter is designed to have zero transmission at the frequency of the interferer. While these amplitude-based techniques do not require precise knowledge of the interferer's delay, they are applicable only to fixed-frequency interference; tunability is—at best—limited. Large changes in interference frequency requires redesign of the entire structure and broadband applications would require an intractable number of filter taps.

In contrast to the above techniques, which require intimate knowledge of the interfering signals frequency and/or time-delay (absolute phase), embodiments of the present disclosure provide interference suppression based on the power of the interfering signal. By exploiting the unique power- (or voltage) dependent transmission function of an externally angle-modulated photonic link, embodiments of the present disclosure provide strong wideband interference suppression without requiring detailed knowledge of the interfering signal. Embodiments of the present disclosure further enable suppression of interference when a desired signal for reception (or one or more interfering signals) moves in frequency, avoiding the need to continually tune filters. Thus, embodiments of the present disclosure are advantageously configured to use techniques to get rid of interferers that is agnostic to their frequency, which provide flexible systems and methods for interference suppression.

3. INTERFERENCE SUPPRESSION BASED ON THE POWER OF INTERFERING SIGNAL

Embodiments of the present disclosure exploit the non-linear power-dependent transfer function of an angle-modulated analog optical link to discriminate between high and low power signals. This enables suppression of strong interfering signals while maintaining a linear response for signals at lower power levels. Embodiments of the present disclosure are configured to zero out one or more strong (e.g., high power) interfering signals without also zeroing out one or more weak (e.g., lower power) signals that contain desired information.

For a variety of optical link architectures, the output current as a function of time is proportional to the input voltage as an argument to a Bessel function. A Bessel function in accordance with embodiments of the present disclosure is an oscillatory function whose magnitude depends on the magnitude of its argument relative to a figure of merit (e.g., $V\pi$ in Eq. (7), which is described in greater detail below). If signals are sufficiently low power, an output signal is linearly proportional to an input signal. If the input power increases to a certain point, the system response can be forced to a null—that is, a zero of the Bessel function response—such that for large enough input power, there is no RF power output. For example, if the ratio of voltage to halfway voltage in a Bessel function for an optical link device is set at a certain point and maintained at a constant value, then an output signal can be forced to zero for a nonzero input. This operation is independent of frequency and bandwidth and only depends on the input signal amplitude. Further, this operation requires no tunability, the response is substantially instantaneous, and it is applicable to a wide range of signals. Thus, by configuring the ratio of voltage to halfway voltage in a Bessel function appropriately in an optical link device, the amplitude of weak signals that contain desired information can be substantially preserved while the amplitude of strong interferers is zeroed out.

3.1. Exemplary Application of Interference Suppression in an Optical Link

FIG. 1 shows a schematic of an application of an embodiment of the present disclosure to a radio frequency (RF) system with an optical link. FIG. 1 shows a receiving antenna 102 coupled to an optical link 104 (e.g., an angle-modulated analog optical link device). The output from antenna 102 is passed through optical link 104, which is configured to transmit a signal to a receiver 106. In an embodiment, optical link 104 includes a receiver configured to receive the signal from the antenna. In an embodiment, optical link 104 includes an electrical-to-optical (E/O) component (e.g., configured to receive the signal from the antenna and/or to convert the signal to an optical format). In an embodiment, optical link 104 includes an optical-to-electrical (O/E) component (e.g., configured to transmit the signal to receiver 106). E/O component 804 and O/E component 806 are described below with respect to FIG. 9A.

In an embodiment, optical link 104 includes interference suppression module 108. In an embodiment, interference suppression module 108 is configured to suppress interference of a strong, interfering signal without also suppressing a weak, desired signal. While interference suppression module 108 is shown implemented in optical link 104, it should be understood that interference suppression module 108 can be located in receiver 106 or as a standalone device in accordance with embodiments of the present disclosure.

Interference suppression module 108 can be implemented using hardware, software, or a combination of hardware and software. For example, interference suppression module 108 can be implemented using analog filters, digital filters, and/or computer code. Interference suppression module 108 can also be implemented using one or more chips integrated into a device (e.g., optical link 104). Interference suppression module 108 can also be implemented as a standalone, special purpose device (implemented using hardware, software, or a combination of hardware and software) in communication with antenna 102, optical link 104, and/or receiver 106.

Optical link 104 can be implemented in a variety of architectures, including intensity-modulated direct-detection (IMDD, where optical phase modulation is converted to intensity modulation in the optical modulator), phase-modulated with interferometric detection (PMID, where optical phase modulation is converted to intensity modulation with an external interferometer), and polarization modulated (PoIM, where modulation of the polarization of the electric field is converted to intensity modulation using an analyzer). Below, an example of an IMDD link is used to describe embodiments of the present disclosure. However, it should be understood that embodiments of the present disclosure are applicable to other link architectures, and embodiments of the present disclosure are not limited to IMDD links.

A key capability of embodiments of the present disclosure is the ability to control the amplitude $i_{fund}(t)$ of a large (fundamental) signal (discussed with respect to Eq. (7) in greater detail below) at the link output by tailoring its amplitude (e.g., $|v_k(t)|$ in Eq. (7)) at the link input. For example, both a large, interfering signal and a smaller signal that contains desired information can be oscillating signals. Each of these signals can contain "zeroes" (i.e., locations in which the oscillating signal has a current value $i_{fund}(t)$ of zero) at different locations as a function of the input voltage. If a voltage amplitude (e.g., $|v_k(t)|$ discussed with respect to Eq. (7) below in greater detail) is selected to satisfy a zero of the large, interfering signal, the response goes to zero for the strong signal without also zeroing out the smaller, desired signal (e.g., because the zero of the smaller, desired signal is in a different location than the zero of the stronger, interfering signal). Thus, for a given strong, interfering signal, the operating point of an optical link device to be at a zero of the strong, interfering signal. At this point, any smaller signal that does not contain a zero at this point sees a nonzero transmission through the optical link device.

For example, in FIG. 1, optical link 104 can receive one or more small, desired signals and one or more large, interfering signals via antenna 102. Optical link 104 can detect the difference in power between these sets of signals and can determine that the higher power signals represent interference to be zeroed out. Given the known power of the high power interfering signal, optical link 104 can then determine one or more zeroes for the interfering signal(s) and can configure itself to operate at one or more of these zeroes so that the interference is cancelled out while the information in the desired signals is passed through. For example, optical link device 104 can be configured to select an operating voltage amplitude (e.g., $|v_k(t)|$ discussed with respect to Eq. (7) below in greater detail) to satisfy a zero of the large, interfering signals. Thus, optical link 104 can force its optical modulator to be zero for the power of the interference to preserve the smaller, desired signal(s) (and avoid damaging receiver 106 with very high power signals).

Figure 2:
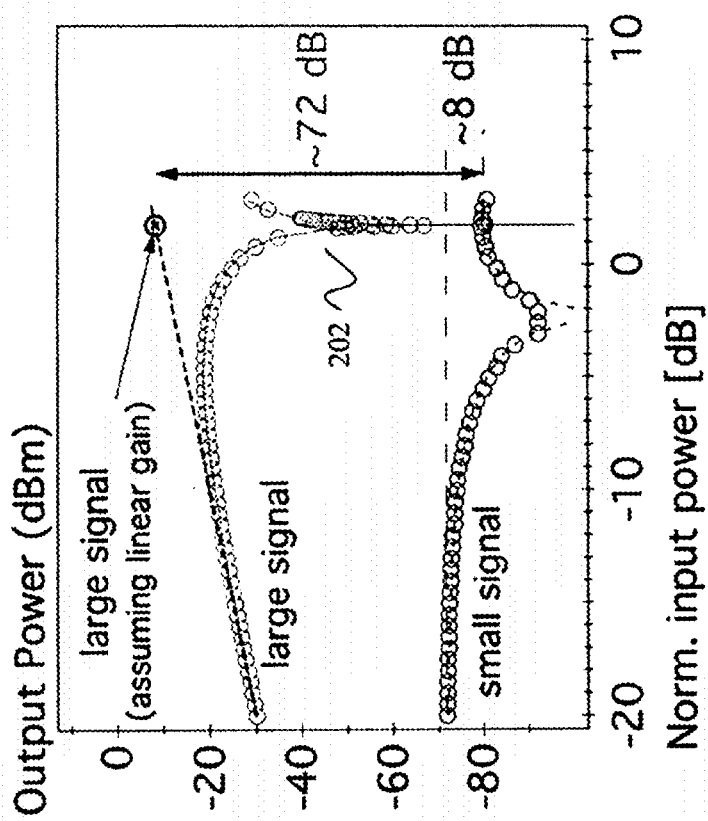
FIG. 2 is a diagram showing differing zeroes of a strong, interfering signal and a weak, desired signal in accordance with an embodiment of the present disclosure.

FIG. 2 is a diagram showing differing zeroes of a large, strong, interfering signal and a small, weak, desired signal in accordance with an embodiment of the present disclosure. At element 202, the output power of the large, strong, interfering signal becomes zero, while the output power of the small, weak, desired signal stays at a nonzero value. Thus, the small, weak, desired signal can be seen while the large, strong, interfering signal can be zeroed out if the operating point of optical link 104 is set to match the location 202 of the zero of the strong signal.

3.2 Exemplary Method for Interference Suppression in an Optical Link

Figure 3:
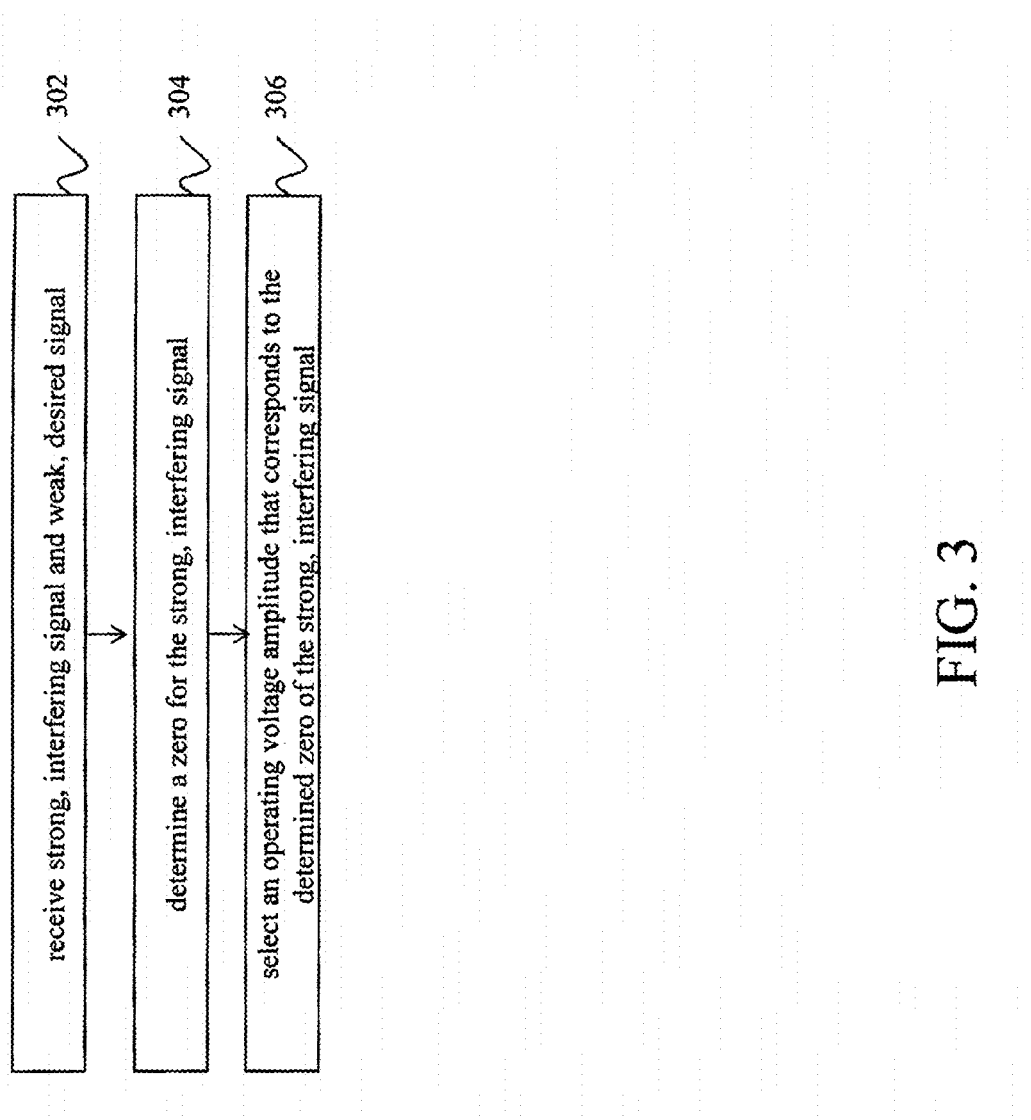
FIG. 3 is a flowchart of a method for interference suppression in accordance with an embodiment of the present disclosure.

FIG. 3 is a flowchart of a method for interference suppression in accordance with an embodiment of the present disclosure. In step 302, a strong, interfering signal and a weak, desired signal are received. For example, in an embodiment, optical link 104 receives the strong and weak signals via antenna 102 and sends this information to interference suppression module 108. In step 304, a zero for the strong, interfering signal is determined. For example, in an embodiment, interference suppression module 108 determines one or more points where the current of the strong, interfering signal, reaches 0 (e.g., with respect to time, input voltage, operating voltage, etc.). In step 306, an operating voltage amplitude that corresponds to the determined zero of the strong, interfering signal is selected (e.g., through a process like automatic gain control, gain leveling, or other suitable means). For example, in an embodiment, interference suppression module 108 determines one or more operating voltages that correspond to a zero in the current of the strong, interfering signal and configures optical link 104 to operate at this determined operating voltage (e.g., with respect to Eq. (7), described below, $|v_k(t)|$ is selected to satisfy the zero of $J_1$).

4. THEORY OF OPERATION

An exemplary theory of operation for systems and methods according to embodiments of the present disclosure will now be described in greater detail with respect to an IMDD link. As noted above, it should be understood that embodiments of the present disclosure are applicable to other link architectures, and embodiments of the present disclosure are not limited to IMDD links.

To understand how the nonlinear transfer function of an IMDD analog optical link can be used to suppress strong undesired signals, the link output for a multi-signal input is considered. Here, we consider the input to consist of N real, potentially amplitude- and phase- or frequency-modulated, signals of the form $$v_{in}(t) = \sum_{n=1}^{N} |v_n(t)| \cos[\omega_n t + \theta_n(t)]. \quad (1)$$

Above, $|v_n(t)|$, $\theta_n(t)$, and $\omega_n$ are the magnitude of the time-domain voltage envelope, the time-varying temporal phase representing phase or frequency modulation, and the center frequency of the n-th signal, respectively. The output photocurrent from an IMDD link may be generally written $$i(t) = I_{avg}\{1 - \cos[\phi_b + h_{mzm}(t) * v_{in}(t)]\}, \quad (2)$$

where the impulse response of the Mach-Zehnder modulator (MZM) is given by $$h_{mzm}(t) = \mathcal{F}^{-1}\left\{\frac{\pi}{V_\pi(\omega)}\right\}, \quad (3)$$

and the modulator bias phase is given by $\phi_b$. Here, $V_\pi(\omega)$ is the frequency-dependent halfwave voltage of the MZM.

Inserting Eq. (1) into Eq. (2) under the assumption that the voltage envelope and temporal phase excursion are sufficiently slowly-varying (i.e., narrow-band in the frequency-domain) that the halfwave voltage may be assumed constant over the signal bandwidth, the output photocurrent may be written as $$i(t) = I_{avg}\left\{1 - \cos\left[\phi_b + \sum_{n=1}^{N} \pi \frac{|v_n(t)|}{V_\pi(\omega_n)} \cos[\omega_n t + \theta_n(t)]\right]\right\}. \quad (4)$$

When the link is operated at quadrature bias the photocurrent, the above expression becomes $$i(t) = I_{avg}\left\{1 - \sin\left[\sum_{n=1}^{N} \pi \frac{|v_n(t)|}{V_\pi(\omega_n)} \cos[\omega_n t + \theta_n(t)]\right]\right\}. \quad (5)$$

To explicitly show the interaction between signals present at the link input, the sine is expanded using Euler's identity, and the resulting complex exponentials are expanded in terms of Bessel functions via the Jacobi-Anger expansions. The resulting photocurrent is written as $$i(t) = I_{avg} - \frac{I_{avg}}{2j} \prod_{n=1}^{N} \left\{ J_0\left[\pi \frac{|v_n(t)|}{V_\pi(\omega_n)}\right] - \right. \quad (6)$$

$$2\sum_{m=1}^{\infty} j^m J_m\left[\pi \frac{|v_n(t)|}{V_\pi(\omega_n)}\right] \cos[m\omega_n t + m\theta_n(t)]\right\} +$$

-continued $$\frac{I_{avg}}{2j} \prod_{n=1}^{N} \left\{ J_0\left[\pi \frac{|v_n(t)|}{V_\pi(\omega_n)}\right] + \right.$$

$$2\sum_{m=1}^{\infty} j^m J_m\left[-\pi \frac{|v_n(t)|}{V_\pi(\omega_n)}\right] \cos[m\omega_n t + m\theta_n(t)]\right\}.$$

Given that, for integer-order $mJ_m(-x) = (-1)^m J_m(x)$, the above expression consists only of odd-order mixing products—as expected for a quadrature-biased IMDD link. Three components of the above expression that are of interest are the fundamental, third-harmonic, and third-order intermodulation distortion responses. From Eq. (6), the amplitudes of these three signal components (at angular frequencies $\omega_k$, $3\omega_k$, and $l\omega_k + m\omega_{k'} + p\omega_{k''}$) are found to be $$i_{fund}(t) = 2I_{avg} J_1\left[\pi \frac{|v_k(t)|}{V_\pi(\omega_k)}\right] \prod_{\substack{n\geq 1 \\ n\neq k}}^{N} J_0\left[\pi \frac{|v_n(t)|}{V_\pi(\omega_n)}\right], \quad (7)$$

$$i_{3-H}(t) = 2I_{avg} J_3\left[\pi \frac{|v_k(t)|}{V_\pi(\omega_k)}\right] \prod_{\substack{n\geq 1 \\ n\neq k}}^{N} J_0\left[\pi \frac{|v_n(t)|}{V_\pi(\omega_n)}\right], \quad (8)$$

and $$i_{3-IMD}(t) = \quad (9)$$

$$2I_{avg} J_l\left[\pi \frac{|v_k(t)|}{V_\pi(\omega_k)}\right] J_m\left[\pi \frac{|v_{k'}(t)|}{V_\pi(\omega_{k'})}\right] J_p\left[\pi \frac{|v_{k''}(t)|}{V_\pi(\omega_{k''})}\right] \prod_{\substack{n\geq 1 \\ n\neq k,k',k''}}^{N} J_0\left[\pi \frac{|v_n(t)|}{V_\pi(\omega_n)}\right],$$

$$l + m + p = 3.$$

A key concept of embodiments of the present disclosure is that we may control the amplitude $i_{fund}(t)$ of a large (fundamental) signal given by Eq. (7) at the link output by tailoring its amplitude $|v_k(t)|$ at the link input. This mode of operation which exploits the power-dependent gain of the analog link is discussed further below. The nonlinear distortion described by Eq. (8) and Eq. (9) may be addressed with a number of optical or electronic linearization techniques.

The $J_1$ term in Eq. (7) may be a large, interfering signal that is desired to be suppressed or, alternatively, a small signal-of-interest. Mathematically, $J_1$ is a first order Bessel function of the first kind. If the amplitude $|v_k(t)|$ is selected to satisfy the zero of $J_1$, the response goes to zero for the strong signal $J_1$. If $|v_k(t)|$ is large, $i_{fund}(t)$ goes to zero. If $|v_k(t)|$ is instead small (e.g., a desired signal as opposed to interference), $i_{fund}(t)$, the output current remains visible because $J_0$ and $J_1$ have zeroes at different locations relative to the input voltage (e.g., as illustrated by FIG. 2). In an embodiment, by selecting the amplitude $|v_k(t)|$ to satisfy the zero of $J_1$, interference suppression module 108 can be configured to zero out a strong, interfering signal while passing along a weak, desired signal.

5. INPUT POWER-DEPENDENT GAIN IN IMDD ANALOG LINKS

In typical applications, such as analog storage or antenna remoting, the IMDD link is operating under small-signal conditions where the input signal voltage is small compared to the halfwave voltage of the modulator $|v_{k,n}(t)| \ll V_\pi(\omega)$.

Under these conditions, all Bessel functions in Eq. (7) may be approximated by the leading term in their respective Taylor series expansion [$J_1(x) \approx x/2$, $J_0(x) \approx 1$]. The resulting small-signal current is then expressed as $$i_k(t) = \pi I_{avg} \frac{|v_k(t)|}{V_\pi(\omega_k)}. \qquad (10)$$

The ratio of the fundamental output power $P_{out}(t)=|i_k(t)|^2 R_o$ to the input power $P_{out}(t)=|v_k(t)|^2/R_i$ then gives the small-signal power gain (assuming there is no resistive matching of the photodiode output to the load impedance $R_o$ $$G = \left[\pi \frac{I_{avg}}{V_\pi(\omega)}\right]^2 R_o R_i. \qquad (11)$$

For applications where a strong signal (or, multiple signals) obscure weaker signals of interest, we may exploit the fact that the link gain is a function of the input signal amplitude to suppress the strong interfering signal while maintaining a linear small-signal response to weaker signals. To illustrate this, we consider the fundamental output signal from the link (Eq. (7)) when the link input consists of a collection of signals satisfying the small-signal condition $v(t) \ll V_\pi(\omega)$, along with a single strong interference signal that does not meet this requirement. In this case, when considering the amplitude of the large signal at the link output the first-order Bessel function must be retained in Eq. (7), while all zeroth-order Bessel functions may be approximated as unity. The resulting large signal current amplitude is given by $$i_L(t) = 2 I_{avg} J_1\left[\pi \frac{|v_L(t)|}{V_\pi(\omega_L)}\right], \qquad (12)$$

and the RF gain of the large signal is expressed as $$G_L(t) = 4 I_{avg}^2 J_1^2\left[\pi \frac{|v_L(t)|}{V_\pi(\omega_L)}\right] R_i R_o / |v_L(t)|^2. \qquad (13)$$

Note, when the input signal voltage is adjusted—for example with appropriate automatic gain control (AGC)—such that the Bessel function argument corresponds to the first (or higher) zero of $J_1(\,)$ the link gain for the large signal may be driven to $G_L(t)=0$, effectively removing the large signal at the link output. It is important to note that it is the magnitude of the input signal $|v_n(t)|$ relative to the halfwave voltage of the optical modulator which determines the magnitude of the gain of the photonic link (i.e., the level of interference suppression)—the time-dependent phase $\theta_n(t)$ and absolute frequency have no effect on the technique. Therefore, this technique may be applied to a variety of real-world waveforms including sinusoids, linear or nonlinear frequency-modulated continuous-wave (FMCW), phase-modulated sinusoids as well as bandwidth-limited pulses.

If we now consider the amplitude of a single small-signal at the link output when the amplitude of the large interferer is selected such that $J_1[\pi|v_L(t)|/V_\pi(\omega_L)]=0$ we find that the small signal current is given by $$i_S(t) = \pi I_{avg} \frac{|v_S(t)|}{V_\pi(\omega_S)} J_0\left[\pi \frac{|v_L(t)|}{V_\pi(\omega_L)}\right]. \qquad (14)$$

The small-signal power gain in the presence of the interferer is then $$G_S(t) = \left[\pi \frac{I_{avg}}{V_\pi(\omega_S)}\right]^2 R_i R_o \times J_0^2\left[\pi \frac{|v_L(t)|}{V_\pi(\omega_L)}\right]. \qquad (15)$$

Of particular importance is that the small signal link response remains linear, albeit with a gain penalty equal to the quantity $J_0^2[\pi|v_L(t)|/V_\pi(\omega_L)]$ relative to the small-signal gain given by Eq. (11). When the large signal amplitude is adjusted such that $J_1[\pi|v_L(t)|/V_\pi(\omega_L)]=0$, the resulting small-signal gain penalty is $J_0^2[\pi|v_L(t)|/V_\pi(\omega_L)]=0.1622$ or approximately −8 dB. Note, we have retained the time-dependence of the nonlinear gain equations because the entire temporal envelope $|v_L(t)|$ will contribute to the suppression achieved for a particular strong interferer.

6. EXEMPLARY APPLICATIONS

Figure 4:
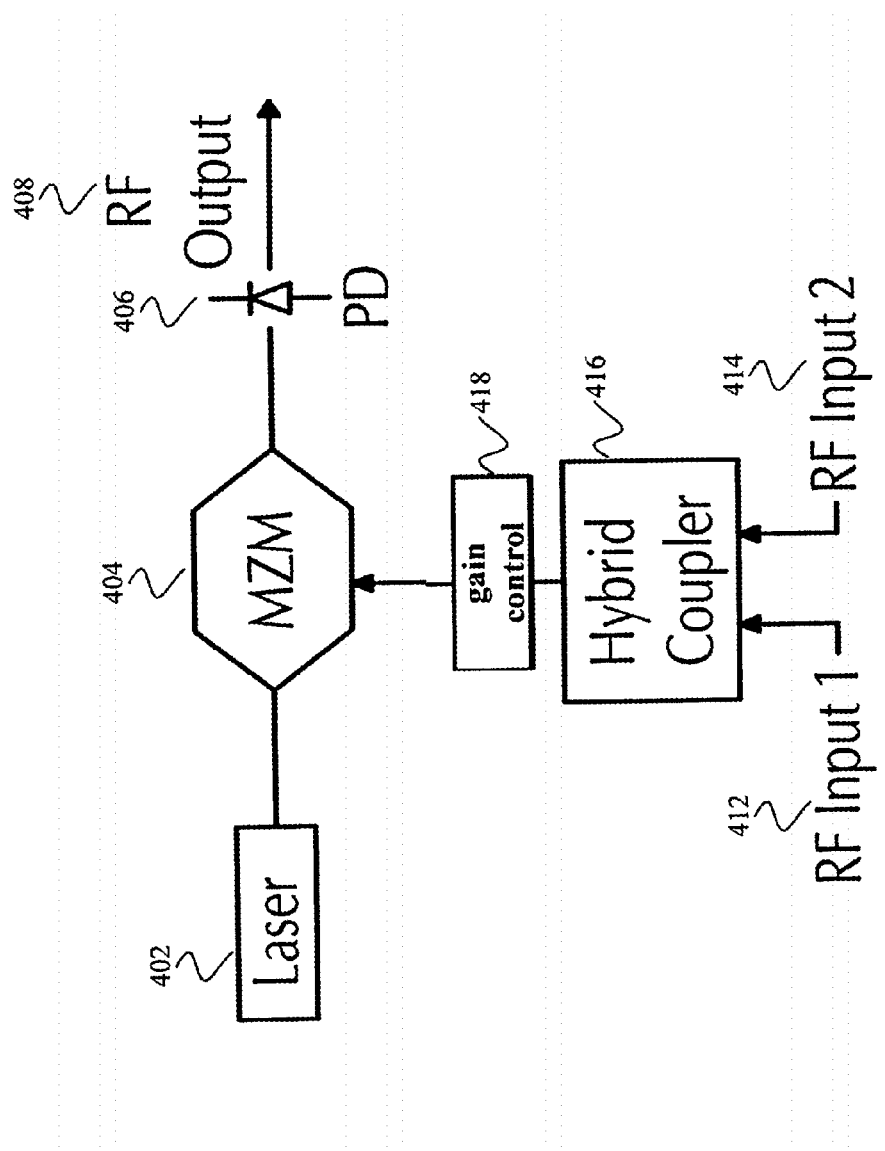
FIG. 4 is a diagram of an IMDD link consisting of a distributed feedback laser, low-halfwave voltage LiNbO$_3$ Mach-Zehnder intensity modulator, and high-speed photodiode in accordance with an embodiment of the present disclosure.

In an embodiment, interference suppression module 108 can be implemented using a Mach-Zehnder intensity modulator. Exemplary applications of embodiments of the present disclosure are discussed below with respect to FIGS. 4-8. FIG. 4 is a diagram of an IMDD link consisting of a distributed feedback laser 402, low-halfwave voltage LiNbO$_3$ Mach-Zehnder intensity modulator 404, and high-speed photodiode 406 in accordance with an embodiment of the present disclosure. The modulator halfwave voltage is approximately $V_\pi=1$ V, and the link operates at an average photocurrent of $I_{avg} \approx 1$-10 mA.

As a first example, we applied two unmodulated sinusoidal signals at a nominal center frequency of 160 MHz (offset from one another by ~10 kHz) to the link input. One signal (the small, desired signal of interest 412) is maintained at an absolute power level of −50 dBm, while the power of the second signal (the strong interferer 414) is varied over the range of −10 dBm to +15 dBm. These signals are coupled via hybrid coupler 416. At the output of the link 408, the power in each signal is measured using an electrical spectrum analyzer as the input power of the large signal is varied. In an embodiment, a gain control module 418 can be positioned between hybrid coupler 416 and MZM 404. In an embodiment, gain control module 418 includes an automatic gain control amplifier (AGC).

Figure 5:
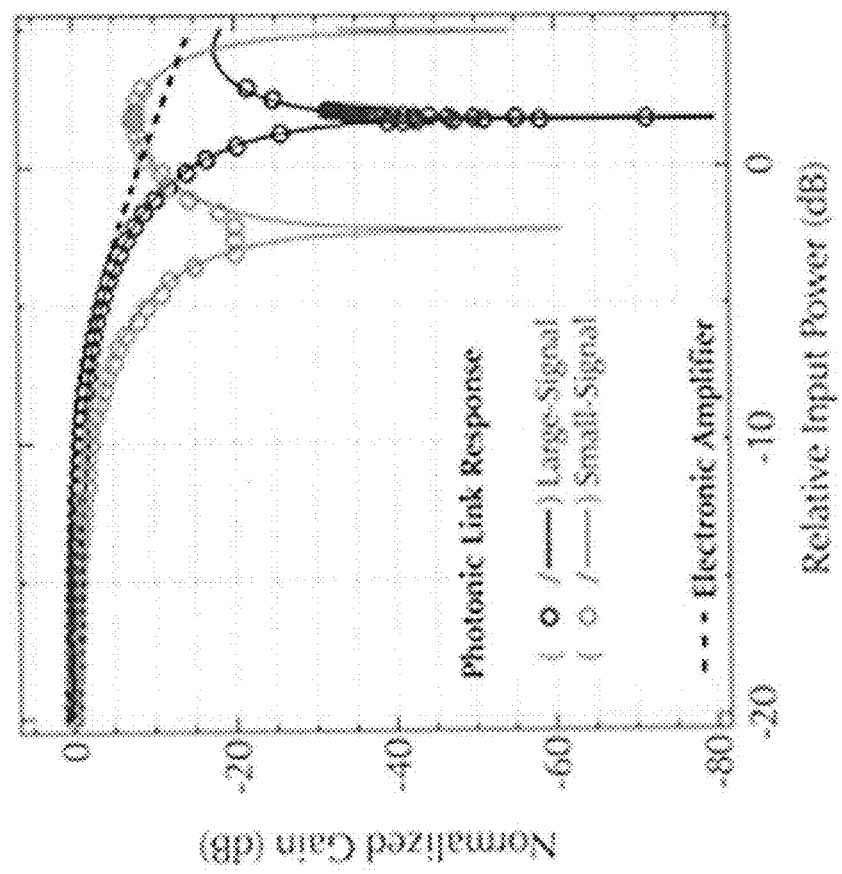
FIG. 5 is a diagram showing the link gain experienced by a weak, desired signal and a strong, interfering signal, normalized to the small-signal composite link loss as a function of the large signal power normalized to the half-wave power of an optical modulator in accordance with an embodiment of the present disclosure.

FIG. 5 is a diagram showing the link gain experienced by each signal, normalized to the small-signal composite link loss (G=−22.0 dB), as a function of the large signal power normalized to the halfwave power of the optical modulator ($P_\pi=V_\pi^2/2R_i$). Here, the symbols represent measured data and the solid lines are calculated values from Eq. (13) and Eq. (15). For low input powers, the link gain experienced by both the small signal of interest (gray) and the interferer (black) correspond to the small-signal link gain. As the interferer power is increased, however, the gain of both signals begins to decrease. Of particular importance is the strong null in the large signal response which occurs for a relative input power of roughly +1.72 dB. Here, the strong signal gain is decreased by more than 70 dB as compared to the small-signal link gain. The small signal response, however, remains linear and sees an approximately 8 dB decrease as discussed above. This illustrates quite clearly how a strong interferer may be greatly reduced in power at the link output while small signals of interest (SOIs) remain visible. For comparison, the compression characteristic of a microwave amplifier is shown by the dashed black line. Here, the amplifier compression characteristic is uniform across all signals present at the input. That is the decrease in gain cannot be used to suppress only strong signals—weak signals see an equal decrease in gain.

To demonstrate the applicability of embodiments of the present disclosure to signals with non-negligible bandwidth, suppression measurements using both bandwidth-limited pulses and linear FMCW waveforms were performed. For these experiments, the hybrid coupler 416 in FIG. 4 is removed, and only a single signal is present at the link input. With the hybrid coupler 416 removed and a factor of 10 increase in average photocurrent, the small-signal link gain is approximately G=−3.3 dB.

Figure 6:
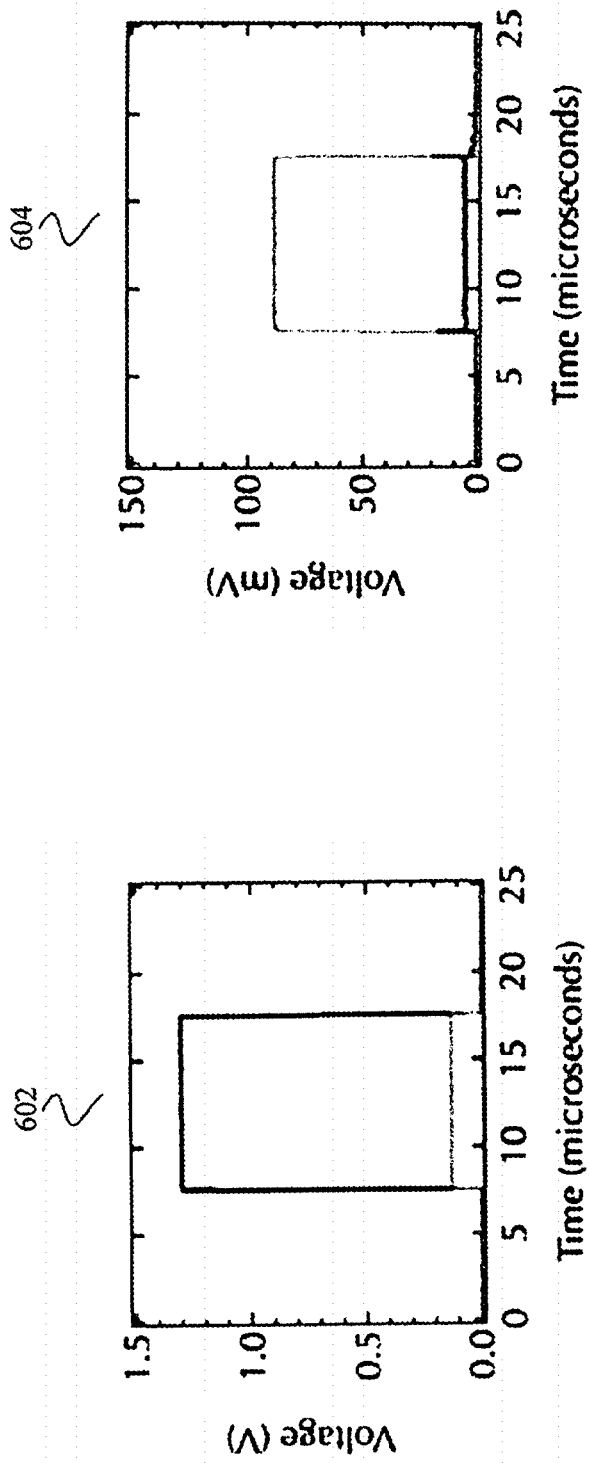
FIG. 6 is a diagram showing time-domain data illustrating strong suppression of bandwidth-limited pulses at a 450 MHz center frequency in accordance with an embodiment of the present disclosure.

FIG. 6 shows time-domain data illustrating strong suppression of bandwidth-limited pulses at a 450 MHz center frequency. FIG. 6 shows input pulse envelopes 602 (gray: small-signal, black: large signal) and output pulse envelopes 604 (gray: small-signal excitation, black: large-signal excitation). We first demonstrate suppression of 10 microsecond duration bandwidth-limited pulses at a center frequency of 450 MHz. In element 602 of FIG. 6, the time-domain voltage envelopes (the 450 MHz oscillations are suppressed for clarity) of the input pulse with an amplitude in the small-signal regime (gray) and with an amplitude leading to substantial signal suppression (black) are shown. The small-signal pulse amplitude is approximately 129 mV and the large signal amplitude is approximately 1.3 V (~1.3×$V_\pi$ at 450 MHz).

Element 604 of FIG. 6 shows the time-domain voltage envelopes of the link output under small (gray) and large (black) signal excitation. Here, the small-signal output amplitude is about 88 mV which shows excellent agreement with the amplitude predicted from the small-signal link gain which predicts a voltage gain of $G_{S,v} \approx 0.68$ (in linear units). The large signal shows strong suppression across the center portion of the waveform—the output amplitude for large signal excitation has been decreased to approximately 5 mV. This decrease in signal amplitude corresponds to an RF power gain of roughly $G_L$=−48 dB. The impulsive features on the leading and trailing edges of the suppressed waveform result from the finite rise-time of the input RF signal. These emphasize the time-dependence of Eq. (13) and Eq. (15).

Figure 7:
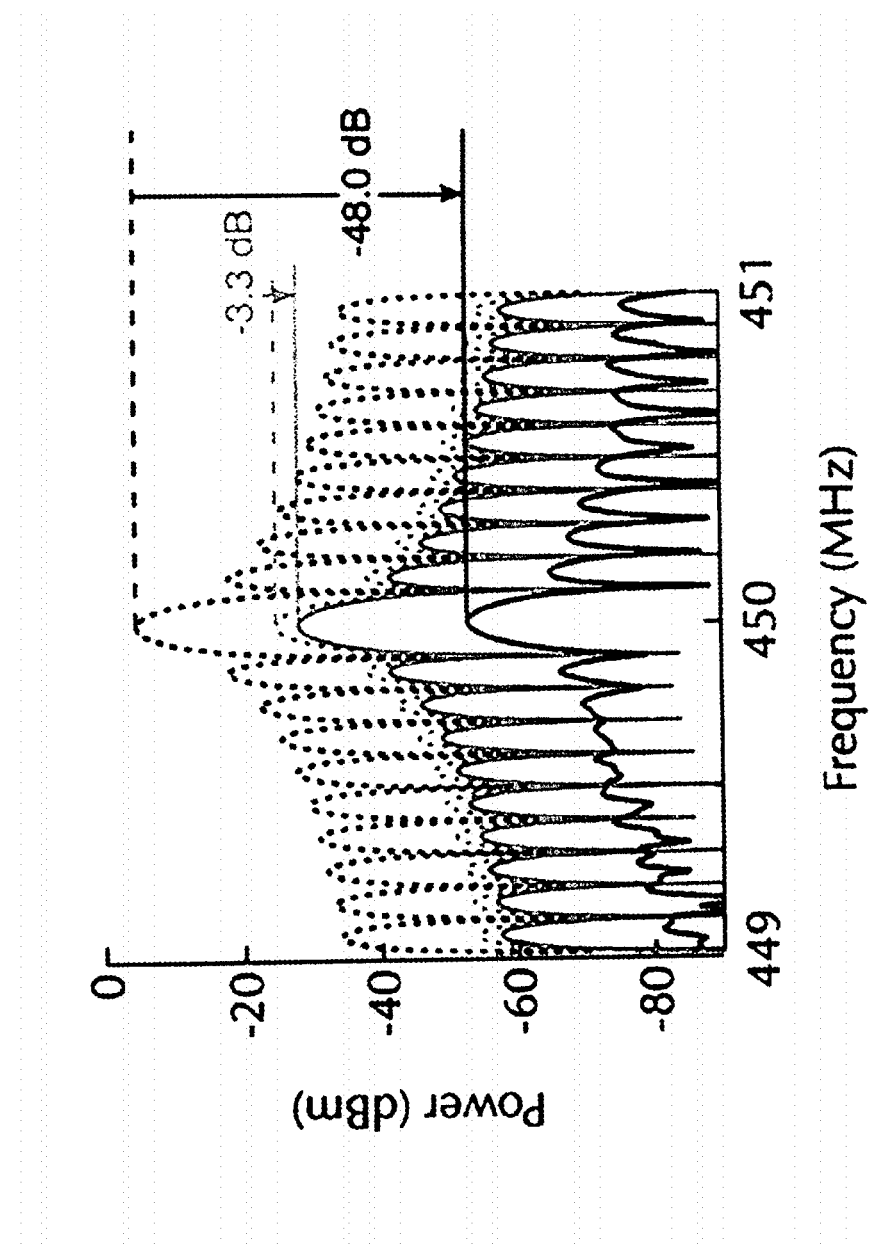
FIG. 7 is a diagram that shows the RF power spectra calculated by taking the fast Fourier transform of the time-domain waveforms shown in FIG. 6 in accordance with an embodiment of the present disclosure.

To provide an alternative (but equivalent) view of the suppression achieved across the waveform bandwidth, FIG. 7 shows the RF power spectra calculated by taking the fast Fourier transform of the time-domain waveforms shown in FIG. 6. Here, the dashed lines correspond to the input power spectra (gray: small-signal, black: large signal), and the solid lines denote the output spectra from the optical link (gray: small-signal excitation, black: large signal excitation). As expected, the decrease in power spectral density agrees with that predicted from the decrease in pulse amplitude in the time-domain. The small-signal experiences the linear link gain (G=−3.3 dB), while the large signal PSD is suppressed by the nonlinear link gain of $G_L$=−48 dB. We see that the suppression is uniform over the large-signal bandwidth (some distortion present due to edge effects) as expected from the uniform suppression across the waveform envelope seen in the black curve of FIG. 4 (*b*).

Figure 8:
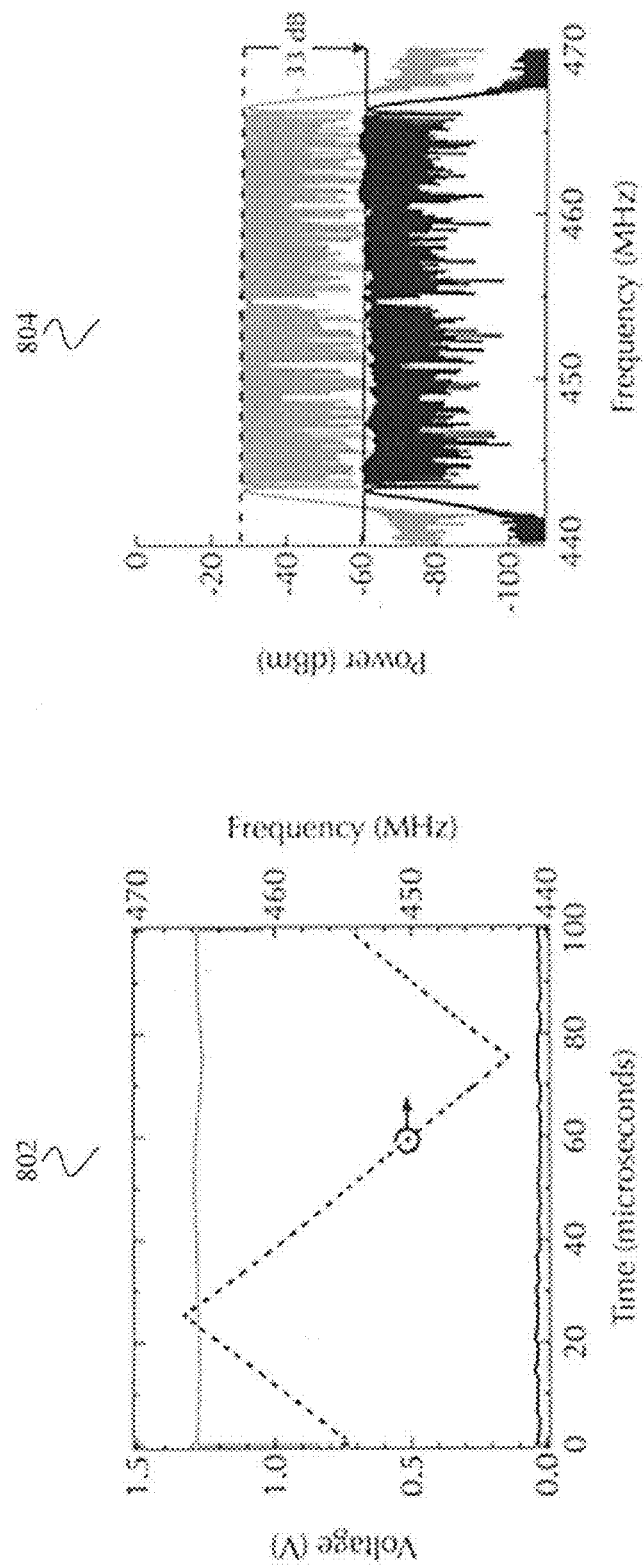
FIG. 8 shows diagrams that illustrate the applicability of embodiments of the present disclosure to suppression of wideband signals in accordance with an embodiment of the present disclosure.

FIG. 8 shows diagrams that illustrate the applicability of embodiments of the present disclosure to suppression of wideband signals in accordance with an embodiment of the present disclosure. In FIG. 8, we apply a 25 MHz bandwidth FMCW signal with a 450 MHz center frequency to the input of the analog link. Here we focus on the large-signal response of the link. In element 802 of FIG. 8, the input waveform's time-domain amplitude is shown by the gray line, and the time-domain amplitude of the output waveform is shown by the solid black line. The instantaneous frequency of the waveform is shown by the dashed black line (frequency is shown on the right-hand axis). Here, the average input signal amplitude is adjusted to approximately satisfy the compression condition (~1.3 V). The average measured output voltage amplitude is approximately 30 mV which corresponds to a large-signal link gain of $G_L \approx$−33 dB. As is evident from the minimal voltage fluctuations present in the output waveform highly uniform suppression is achieved across the waveform bandwidth. This is also clearly seen by comparing the input and output power spectra calculated from the time-domain waveforms. These are shown in element 804 of FIG. 8; the input spectrum is shown in gray and the output waveform spectrum is shown in black. Again, we see a strong suppression across the waveform bandwidth. The decrease in average suppression between the FMCW and bandwidth-limited pulse excitations arises from amplitude fluctuations in the input FMCW waveform. For a smoother input signal, a higher degree of suppression will be achieved at the link output.

7. ADDITIONAL ARCHITECTURES

While the above analysis discusses intensity-modulated analog optical links, the underlying theory describes a variety of angle-modulated architectures, including phase-modulated, intensity-modulated, and polarization-modulated links. Therefore, embodiments of the present disclosure may be realized using any of these architectures as appropriate for a given application.

Figure 9A:
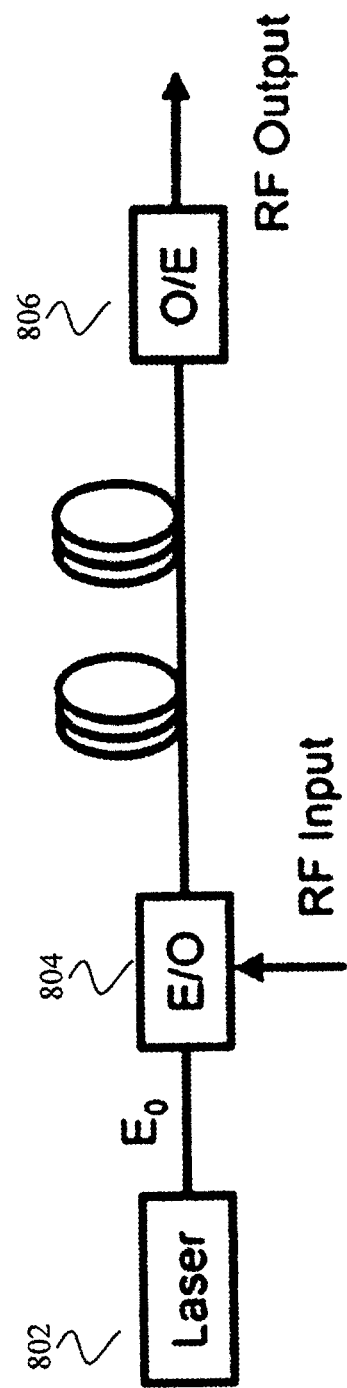
FIG. 9A shows a block diagram of an analog optical link including a laser, an electrical-to-optical (E/O) component, and an optical-to-electrical (O/E) component in accordance with an embodiment of the present disclosure.

FIG. 9A shows a block diagram of an analog optical link including a laser 802, an electrical-to-optical (E/O) component 804, and an optical-to-electrical (O/E) component 806 in accordance with an embodiment of the present disclosure.

Figure 9B:
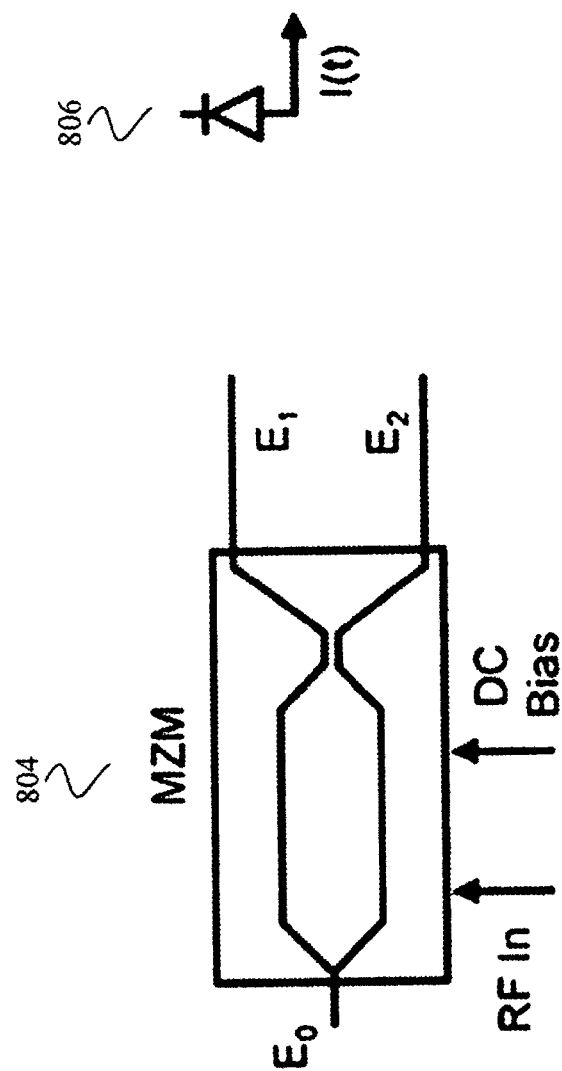
FIG. 9B shows a block diagram of E/O and O/E components for intensity modulation in accordance with an embodiment of the present disclosure.

FIG. 9B shows a block diagram of E/O component 804 and O/E component 806 for intensity modulation in accordance with an embodiment of the present disclosure. In FIG. 9B, E/O component 804 includes a Mach-Zehnder modulator (MZM), and O/E component 806 includes a photodetector.

Figure 9C:
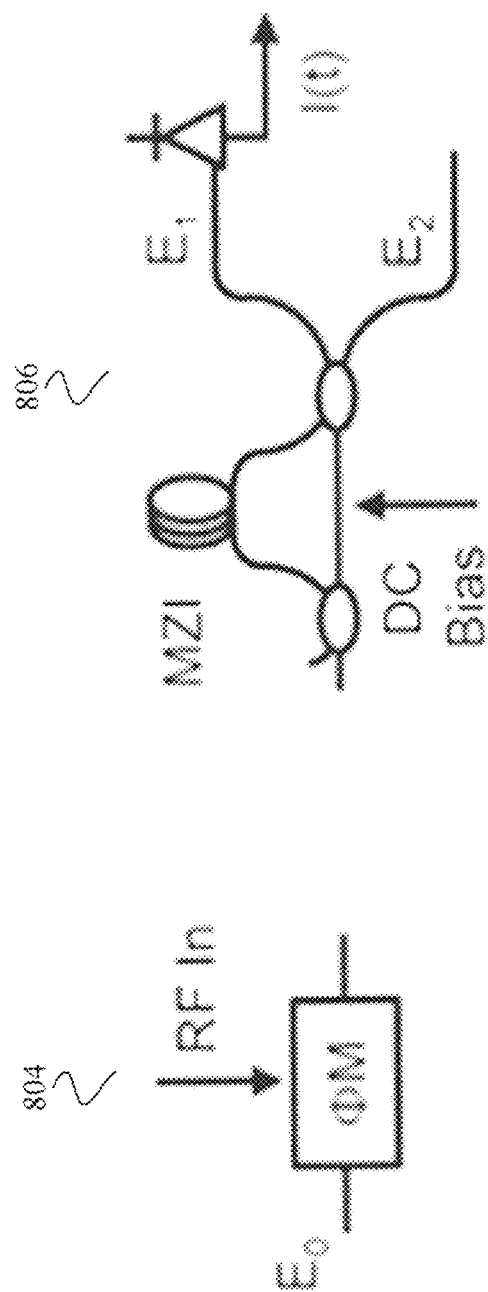
FIG. 9C shows a block diagram of E/O and O/E components for phase modulation in accordance with an embodiment of the present disclosure.

FIG. 9C shows a block diagram of E/O component 804 and O/E component 806 for phase modulation in accordance with an embodiment of the present disclosure. In FIG. 9C, E/O component 804 includes phase modulator (ΦM), and O/E component 806 includes an asymmetric Mach-Zehnder interferometer (MZI) for phase-to-intensity conversion and a photodetector. In an embodiment, the MZI of O/E component 806 in FIG. 9C is configured to convert the phase modulated signal (produced by the phase modulator of E/O component 804 of FIG. 9C) to an intensity modulated signal detectable with a photodiode and to convert the intensity modulated signal to an electrical format. Chromatic dispersion, a coherent demodulator, or other phase-to-intensity techniques, along with the photodetector of O/E component 806, can also be used to achieve O/E conversion.

Figure 9D:
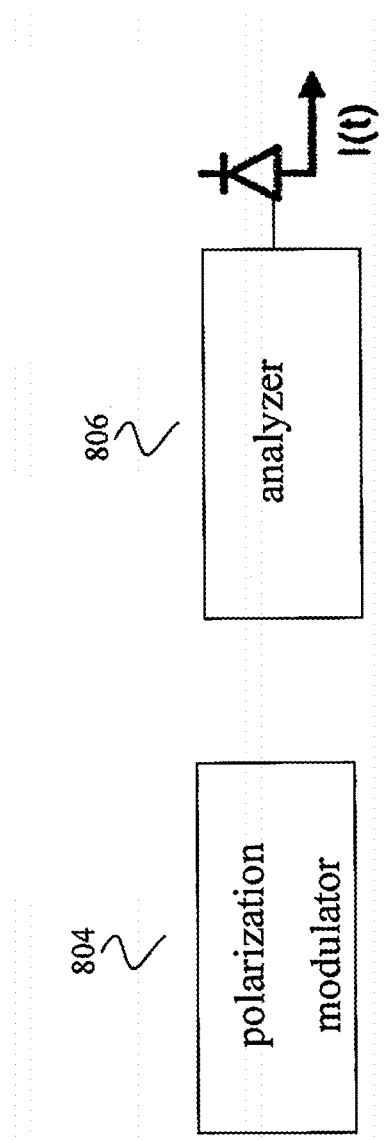
FIG. 9D shows a block diagram of E/O component 804 and O/E component 806 for polarization modulation in accordance with an embodiment of the present disclosure.

FIG. 9D shows a block diagram of E/O component 804 and O/E component 806 for polarization modulation in accordance with an embodiment of the present disclosure. In FIG. 9C, E/O component 804 includes a polarization modulator, and O/E component 806 includes an analyzer (e.g., a polarizer) and photodetector.

8. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An optical link device, comprising:
   a receiver configured to receive a signal from an antenna, wherein the signal includes an interfering signal and a desired signal; and
   an interference suppression module, coupled to the receiver, configured to:
      determine a zero for the interfering signal, and
      select an operating voltage amplitude for the optical link device that corresponds to the determined zero for the interfering signal.

2. The optical link device of claim 1, wherein the interference suppression module is configured to suppress interference in the interfering signal using an intensity modulation technique.

3. The optical link device of claim 1, wherein the interference suppression module is configured to suppress interference in the interfering signal using a phase modulation technique.

4. The optical link device of claim 1, wherein the interference suppression module comprises a Mach-Zehnder modulator.

5. The optical link device of claim 1, further comprising:
   a photodetector, coupled to an output of the interference suppression module, configured to convert an output signal to an electrical format.

6. The optical link device of claim 1, wherein the interference suppression module comprises a phase modulator.

7. The optical link device of claim 1, further comprising:
   an asymmetric Mach-Zehnder interferometer, coupled to an output of the interference suppression module, configured to:
      convert a phase modulated signal to an intensity modulated signal detectable with a photodiode and,
      convert the intensity modulated signal to an electrical format.

8. The optical link device of claim 1, wherein the interference suppression module is configured to suppress interference in the interfering signal using a polarization modulation technique.

9. The optical link device of claim 1, wherein the interference suppression module comprises a polarization modulator configured to generate a polarization-modulated signal.

10. The optical link device of claim 9, further comprising:
    an analyzer, coupled to an output of the interference suppression module, configured to:
       convert the polarization-modulated signal to an intensity-modulated signal, and
       convert the intensity-modulated signal to an electrical format; and
    a photodiode.

11. The optical link device of claim 1, wherein the interference suppression module is configured to select the operating voltage based on a known transfer function of the optical link device.

12. The optical link device of claim 1, wherein the interference suppression module is configured to select the operating voltage based on a Bessel function for the optical link device.

13. A method for interference suppression, the method comprising:

receiving, using an optical link device, a signal comprising a strong interfering signal and a desired signal;

determining, using the optical link device, a zero for the interfering signal; and selecting, using the optical link device, an operating voltage amplitude that corresponds to the determined zero of the strong, interfering signal.

14. The method of claim 10, wherein selecting the operating voltage comprises selecting the operating voltage based on a known transfer function of the optical link device.

15. The optical link device of claim 1, wherein selecting the operating voltage comprises selecting the operating voltage based on a Bessel function for the optical link device.

16. An optical link device, comprising:
an electrical-to-optical (E/O) component configured to:
receive a signal comprising a desired signal and an interfering signal,
determine a zero for the interfering signal, and
select an operating voltage amplitude for the optical link device that corresponds to the determined zero for the interfering signal such that the interfering signal is suppressed and the desired signal is not suppressed; and
an optical-to-electrical (O/E) component configured to generate an output signal based on the selected operating voltage.

17. The optical link device of claim 16, wherein the O/E component comprises a Mach-Zehnder modulator, and wherein the E/O component comprises a photodetector.

18. The optical link device of claim 16, wherein the E/O component comprises a phase modulator, and wherein the O/E component comprises an asymmetric Mach-Zehnder interferometer and a photodetector.

19. The optical link device of claim 16, wherein the E/O component comprises a polarization modulator, and wherein the O/E component comprises an analyzer and a photodetector.

20. The optical link device of claim 16, wherein the E/O component is configured to select the operating voltage based on a known transfer function of the optical link device.

* * * * *

UNITED STATES PATENT AND TRADEMARK OFFICE
CERTIFICATE OF CORRECTION

PATENT NO.        : 9,654,217 B2  
APPLICATION NO.   : 15/046537  
DATED             : May 16, 2017  
INVENTOR(S)       : Jason D. McKinney Page 1 of 1

It is certified that error appears in the above-identified patent and that said Letters Patent is hereby corrected as shown below:

On the Title Page

Please add (73) Assignee:  
The Government of the United States, as represented by the Secretary of the Navy Signed and Sealed this  
Twentieth Day of March, 2018

Andrei Iancu  
*Director of the United States Patent and Trademark Office*